United States Patent [19]
Parker

[11] 4,202,611
[45] May 13, 1980

[54] PROJECTOR APPARATUS AND CONTROL ARRANGEMENT

[75] Inventor: Robert R. Parker, Wheeling, Ill.

[73] Assignee: Bell & Howell Company, Chicago, Ill.

[21] Appl. No.: 2,055

[22] Filed: Jan. 8, 1979

[51] Int. Cl.$^2$ .................... G03B 1/00; H04Q 1/32
[52] U.S. Cl. ................. 352/179; 340/147 PC; 340/172; 352/198
[58] Field of Search ............... 352/178, 179, 170, 124, 352/133, 6, 7, 198; 340/147 R, 147 PC, 172; 353/68, 122

[56] References Cited

U.S. PATENT DOCUMENTS

| | | | |
|---|---|---|---|
| 2,976,520 | 3/1961 | Reenstra | 340/172 X |
| 2,999,227 | 9/1961 | Hezel et al. | 340/172 |
| 3,161,884 | 12/1964 | Perkins | 352/179 |
| 3,201,754 | 8/1975 | Reiner et al. | 340/147 R |
| 3,397,937 | 8/1968 | Schrader | 352/179 X |
| 3,506,967 | 4/1970 | Foley | 340/172 |
| 3,588,828 | 6/1971 | Schulein | 340/172 X |
| 3,675,205 | 7/1972 | Mereen et al. | 340/147 |
| 3,690,750 | 9/1972 | Taillon | 352/124 |
| 3,885,231 | 5/1975 | Gaddy et al. | 340/172 |
| 3,887,277 | 6/1975 | Tepper | 353/122 |
| 4,093,366 | 6/1978 | Hapke | 352/198 |

FOREIGN PATENT DOCUMENTS 964756  3/1975  Canada .............. 340/147 R

*Primary Examiner*—Michael L. Gellner
*Assistant Examiner*—William B. Perkey

*Attorney, Agent, or Firm*—James V. Lapacek; Roger M. Fitz-Gerald

[57] ABSTRACT

One or more remote control arrangements are provided for interconnection to projector apparatus including local controls. Each of the remote control arrangements includes momentary actuated push-button controls for independently controlling the forward, reverse and stop drive modes and the on and off lamp status of the projection apparatus. Each of the remote control arrangements and the local control arrangement generate or synthesize a predetermined control signal corresponding to each of the drive modes and lamp status conditions from a signal waveform inputted to the remote control arrangements from the projection apparatus over one conductor of the interconnection cable between the projection apparatus and each of the remote control arrangements. The interconnection cable includes three conductors; a first conductor carrying the input signal waveform from a signal generator stage of the projection apparatus, a second conductor controlling the forward, reverse and stop status of the projection apparatus, and a third conductor controlling the operational status of the projection lamp and further controlling a lamp status indicator on the remote control arrangement.

The projection apparatus includes arrangements for detecting the various drive mode and lamp status control signals received from the remote control arrangements and for controlling the drive control circuitry, audio circuitry, and fire shutter mechanism in accordance with the control signals inputted from the remote control arrangements.

31 Claims, 4 Drawing Figures

Fig. 1A.

PROJECTOR APPARATUS AND CONTROL ARRANGEMENT

BACKGROUND OF THE INVENTION

1. Field of the Invention

The present invention relates generally to the field of remote control of electrical apparatus and more particularly to the independent control of the operational status of the drive or transport function and illumination source of projection apparatus from one or more remote control arrangements and a local control arrangement.

2. Description of the Prior Art

There are various remote control arrangements for control of electrical and mechanical apparatus utilizing either cable connections between the controlled apparatus and the remote control or a remote control transmitter and a receiver in the controlled apparatus. For example, a remote control unit for channel selection, volume and operational control of a television receiver.

While the various remote control arrangements of the prior art are generally suitable for their intended use, these arrangements are generally complex. Further, the cable interconnected units require a large number of individual conductors to control multiple functions of the controlled apparatus.

CROSS REFERENCE TO RELATED APPLICATION

This application is related to United States Patent Application Ser. No. 001,995, Robert R. Parker, CHANGE OVER CONTROL ARRANGEMENT FOR PROJECTION APPARATUS, filed Jan. 8, 1979.

SUMMARY OF THE INVENTION

Accordingly, it is a principal object of the present invention to provide a new and improved remote control arrangement for the control of projection apparatus wherein one or more remote control arrangements and a local control arrangement on the projection apparatus are capable of independently and concurrently controlling the forward, reverse and stop drive modes and the on and off status of the projection lamp over a three conductor interconnection with the projector apparatus, while also providing a lamp status indicator on each remote control arrangement.

It is another object of the present invention to provide a projection apparatus that requires a minimum number of interconnections to the projector apparatus, requires relatively few components, and provides adequate noise immunity.

Another object of the present invention is a remote control arrangement for projection apparatus wherein a plurality of remote control arrangements and a local control arrangement on the projector apparatus are capable of independently controlling the forward, reverse and stop drive modes and the projection illumination source status of the projector apparatus over three conductors interconnecting each remote control arrangement and the projector apparatus.

Briefly, these and other objects are efficiently achieved by providing one or more remote control arrangements interconnected to projector apparatus including local controls. Each of the remote control arrangements includes momentary actuated push-button controls for independently controlling the forward, reverse and stop drive modes and the on and off lamp status of the projection apparatus. Each of the remote control arrangements and the local control arrangement generate or synthesize a predetermined control signal corresponding to each of the drive modes and lamp status conditions from a signal waveform inputted to the remote control arrangements from the projection apparatus over one conductor of the interconnection cable between the projection apparatus and each of the remote control arrangements. The interconnection cable includes three conductors; a first conductor carrying the input signal waveform from a signal generator stage of the projection apparatus, a second conductor controlling the forward, reverse and stop status of the projection apparatus, and a third conductor controlling the operational status of the projection lamp and further controlling a lamp status indicator on the remote control arrangement.

The projection apparatus includes arrangements for detecting the various drive mode and lamp status control signals received from the remote control arrangements and for controlling the drive control circuitry, audio circuitry, and fire shutter mechanism in accordance with the control signals inputted from the remote control arrangements.

BRIEF DESCRIPTION OF THE DRAWINGS

The invention, both as to its organization and method of operation, together with further objects and advantages thereof will best be understood by reference to the following detailed description taken in connection with the accompanying drawings wherein.

DESCRIPTION OF THE PREFERRED EMBODIMENT

Figure 1A:
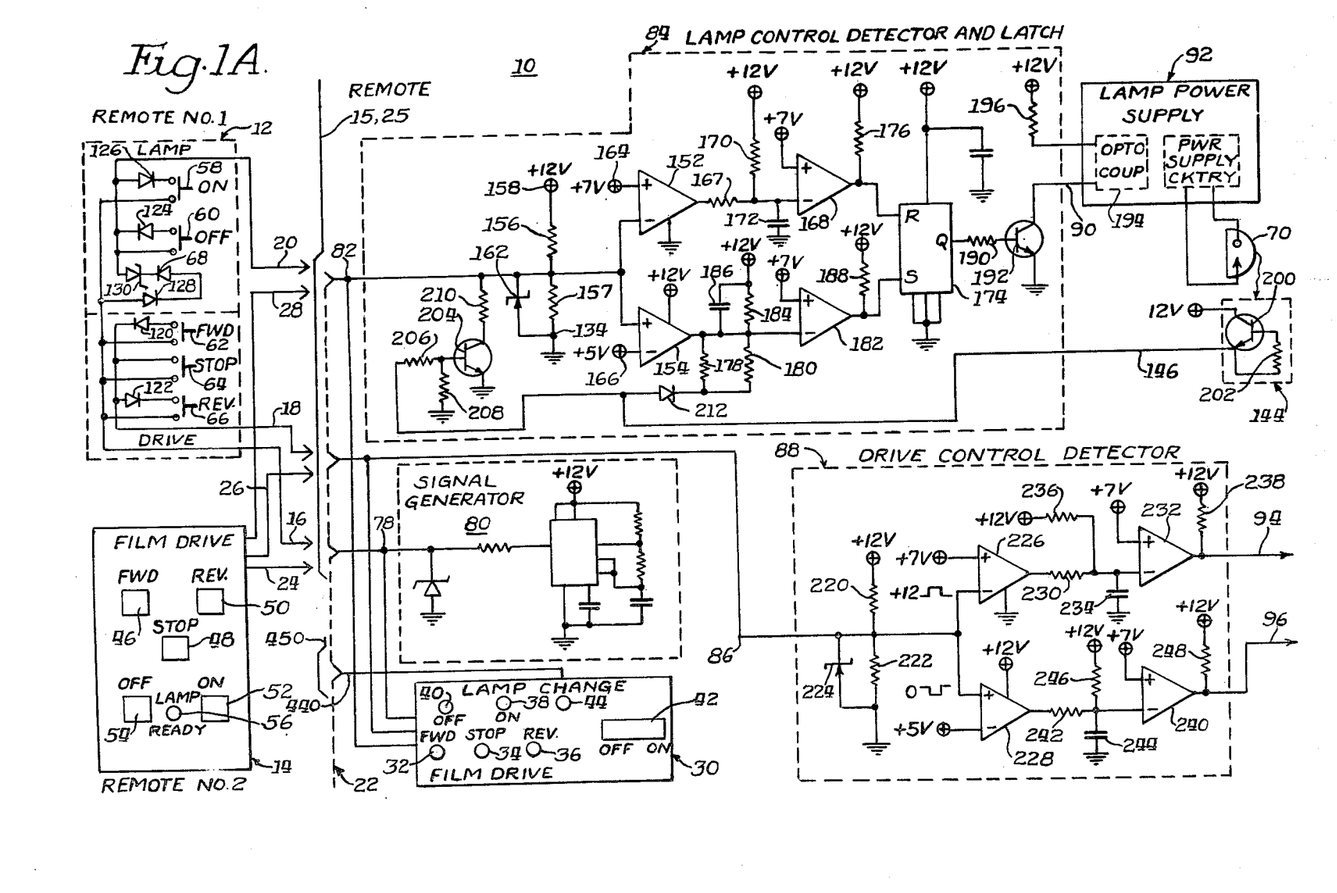
FIGS. 1A and 1B when assembled as shown in FIG. 1C form an electrical schematic, logic and block diagram representation of projection apparatus and control arrangements constructed in accordance with the principles and teachings of the present invention.
Figures 1B, 1C:
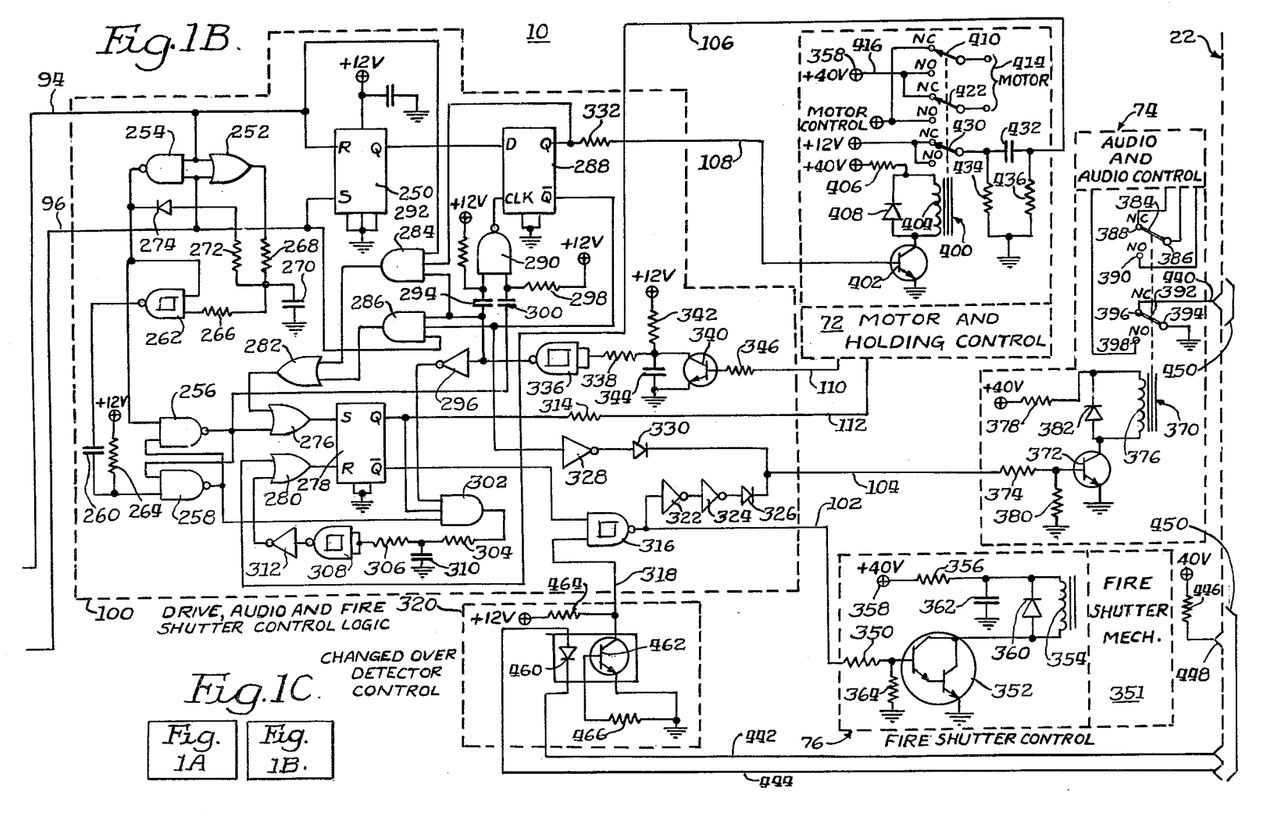

Referring now to FIG. 1, there is illustrated a projector apparatus referred to generally at 10 and interconnected with a first remote control arrangement 12 and a second remote control arrangement 14; the interconnected projector apparatus 10 and the remote control arrangements 12, 14 embodying the principles of the present invention.

The remote control arrangement 12, referred to as remote No. 1, is interconnected to control operation of the projector apparatus 10 over an interconnection cable arrangement 15 including three individual signal control lines or wires 16, 18 and 20. The three signal control lines 16, 18 and 20, comprising the remote No. 1 interconnection cable 15, interconnects the remote control arrangement 12 and the projector 10 through suitable connectors or plug and jack arrangements on the interconnection cable 15 and the projector apparatus 10. In FIG. 1, the housing or frame of the projector apparatus 10 is depicted by the boundary lines 22.

A second remote control arrangement 14, referred to as remote No. 2, is interconnected to the projector apparatus 10 by a remote No. 2 interconnection cable 25 including three signal control lines 24, 26, 28 corresponding respectively to the signal lines 16, 18 and 20 of the remote control arrangement 12. Although two such remote control arrangements 12, 14 are illustrated in FIG. 1, it should be understood that remote operation of the projector apparatus 10 by five or more remote control arrangements is contemplated in accordance with suitable loading and impedance considerations. Further, while a projector apparatus 10 is discussed herein in connection with film drive control, it should be understood that the control arrangements of the present invention can also be utilized for the control of other apparatus.

Operation of the remote control arrangements 12, 14 provide control of the film drive function and the status of the projection illumination source over the remote interconnection cables 15, 25 respectively.

The projection apparatus 10 includes a local control panel or control arrangement 30 provided with various film drive, audio and projection illumination source controls. These controls include three manually operable film drive controls, a forward drive control 32, a stop control 34 and a reverse drive control 36. The local control arrangement 30 further includes projection illumination source controls referred to generally as lamp on control 38 and lamp off control 40. A main power control 42 is also provided on the projector apparatus 10 in a specific embodiment provided by a rocker switch or the like to control the interconnection of the main power supply source, 100 to 240 VAC in various embodiments. The local control arrangement 30 also includes a changeover control 44 to control operation of an externally connected projector apparatus as will be explained in detail hereinafter.

The remote control arrangements 12, 14 include manually operable controls corresponding to the local controls of the local control 30. Thus, referring to the second remote control arrngement 14, the remote control arrangements include manually operable forward, stop and reverse film drive controls referred to at 46, 48 and 50 respectively. The remote control arrangement 14 also includes manually operable lamp on and lamp off controls 52, 54 respectively and a lamp ready status indicator 56 providing an indication of the status of the projection illumination source. In FIG. 1, the remote control arrangement 12 is depicted schematically and the second remote control arrangement 14 is represented diagrammatically and functionally. The remote control arrangement 12, remote No. 1, includes momentary contact, push-button lamp on switch 58 and lamp off switch 60. Similarly the drive controls include momentary contact, push-button forward switch 62, stop switch 64 and reverse switch 66. The remote control arrangement 12 also includes a lamp ready status indicator LED 68.

The remote control arrangements 12, 14 and the local control arrangement 30 upon actuation of the respective manually operable controls provide control signals to the associated control apparatus of the projector 10 to control operation of a projection lamp 70, a drive control and drive motor arrangement 72, an audio and audio control arrangement 74, and a fireshutter control and fireshutter arrangement 76. Specifically, an output 78 of a signal generator 80 is connected to the local control 30 and to the remote control arrangements 12, 14 over lines 16, 24 respectively. The input 82 of a lamp control detector and latch stage 84 is connected to the local control 30 and to the remote control arrangements 12, 14 over the lines 20, 28 respectively. The input 86 of a drive control detector stage 88 is connected to the local control arrangement 30 and the remote control arrangements 12, 14 over the lines 18, 26 respectively.

Thus, the remote control arrangement 12 provides two distinct, predetermined control signals waveforms on line 20 to the lamp control detector and latch stage 84 upon operation of the manually operable lamp control switches 58, 60 respectively. The control signal waveforms are generated or synthesized by modification of the input signal waveform on line 16. The lamp control detector and latch stage 84 detects the control signal waveform to determine if an on or off lamp control signal has been received and detected. The lamp control detector and latch stage 84 generates a lamp status control signal at an output 90 to a lamp power supply 92 in accordance with the signals received at the input 82. The lamp power supply 92 is connected to provide operating power to the projection lamp 70, the projection illumination source.

Similarly, the remote control arrangement 12 upon operation of the manually operable control switches 62, 64 and 66 provides three respective, distinct control signal waveforms at output 18 to the input 86 of the drive control detector stage 88. The drive control detector stage 88 provides drive control signals at outputs 94, 96 in accordance with the control signal waveform at the input 86 to control a drive, audio and fireshutter control logic stage 100. The drive audio and fireshutter control logic 100 controls the fireshutter control and fireshutter arrangement 76 over the output control signal line 102, the audio and audio control arrangement 74 over the output control signal line 104 and the drive control and drive motor arrangement 72 over lines 106, 108, 110 and 112.

Referring now to the remote control arrangement 12, the output signal line 78 of the signal generator 80 is connected over line 16 to one switch terminal or contact of each of the manually operable, momentary contact switches 58, 60, 62, 64 and 66. The second contact or switch terminal of the stop drive control switch 64 is connected to the signal control line 18 through the input 86 of the drive control detector stage 88. The second contact or terminal of the forward drive control switch 62 is connected through a diode 120, anode to cathode, to the signal line 18. The second terminal of the reverse drive control switch 66 is connected through a diode 122, cathode to anode, to the signal line 18. The second terminal of the lamp off switch 60 is connected through a diode 124, anode to cathode, to the signal line 20 to the input 82 of the lamp control detector and latch stage 84. The second contact or terminal of the lamp on switch 58 is connected through a diode 126, cathode to anode, to the signal line 20. The input signal line 16 from the signal generator output 78 is also connected through the series combination of a reverse blocking diode 128 in anode to cathode fashion, the LED status indicator 68 in anode to cathode fashion and a zener diode 130 in cathode to anode fashion to the signal control line 20 connected to the input 82 of the lamp control detector and latch stage 84.

The control switches 58, 60, 62, 64 and 66 are monentary contact switches that provide upon operation a closed contact path across the two contact terminals of each respective switch for a predetermined time interval. Thus, the predetermined control signal waveforms on the signal lines 18, 20 as synthesized by the respective circuitry of the remote control arrangement 12 are generated for a predetermined time interval corresponding to the operating time of the momentary contact switches 58 through 66.

Figure 2:
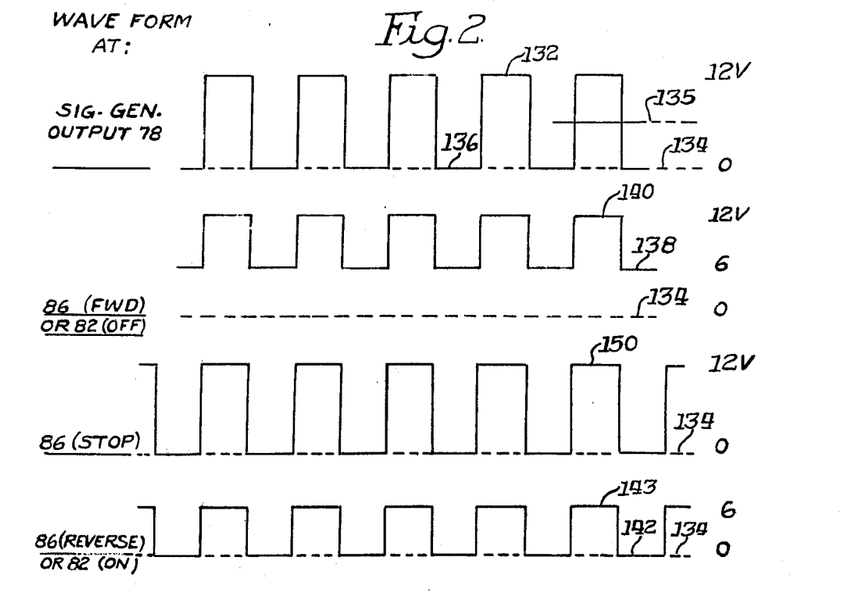
FIG. 2 is a diagrammatic representation of various signal waveforms occurring at the designated locations in the projection apparatus and control arrangements of FIG. 1.

Referring now to FIG. 2, and in connection with the preferred specific embodiment of FIG. 1, the output 78 of the signal generator stage 80 is a square wave of approximately 50% duty cycle and having maximum amplitude excursions at 132 with respect to the minimum base portion 136 along a ground reference base line 134. In a specific embodiment, the operating frequency of the signal generator 88 is approximately 5 KHz although it should be understood that the function and operation of the remote control arrangement 12 and the projector apparatus 10 is independent of the particular frequency of operation of the signal generator 80; appropriate components of the projector control apparatus 10, specifically in the lamp control detector and latch stage 84 and the drive control detector stage 88 as discussed hereinafter, being suitably modified for other operating frequencies. However, it has been found that 5 KHz is suitable for the operating frequency of the signal generator 80 so as to minimize the size of the components utilized in the detector stages 84 and 88 and to minimize the generation of high harmonic frequencies on the control lines 18 and 20.

Thus, the square wave signal waveform at 78 of the signal generator 80 includes positive 132 and negative 136 amplitude excursions with respect to a center reference amplitude level 135. The input signal lines 82 and 86 of the lamp control detector and latch stage 84 and the drive control detector stage 88 respectively are provided by the respective circuitry with a DC bias level approximately equal to the center reference amplitude level 135.

For example, in a specific embodiment to be discussed for illustrative purposes, if the maximum positive and negative excursions 132, 136 correspond to approximately ±6 VDC about the center reference line 135, the bias level at lines 82 and 86 is also equal to approximately +6 VDC. Thus in the specific embodiment, the peak amplitude 132 of the square wave is approximately 12 VDC with respect to the zero volt reference potential 134. Upon operation of the lamp off switch 60 on the remote control arrangement 12, the portion of the waveform at 78 above the center line 135 passes through the diode 124 and onto the line 82 with the resulting waveform on line 82 depicted in FIG. 2, as 82 (OFF). The off waveform on line 82 is a square wave with a base level 138 of approximately +6 VDC and a maximum peak amplitude 140 of approximately +12 VDC, all with respect to the zero volt reference potential 134. Thus upon operation of the lamp off switch 60, during the momentary operation time of the momentary contact switch 60, the positive half of the input waveform 78 is directed on the control signal line 82. It should be understood that the voltage levels discussed herein are only approximate voltage levels. For example, the peak voltage 140 on line 82 in the off mode signalling is somewhat less than 12 volts due to the voltage drop across the diode 124. Similarly, the base reference 138 is somewhat higher than 6 volts due to the forward diode drop. The tolerances of the various bias levels on lines 82, 86 and the output waveform 78 will be discussed in detail hereinafter in connection with the circuitry of the lamp control detector and lamp stage 84 and the drive control detector stage 88.

Upon operation of the momentary contact lamp on switch 58 of the remote control arrangement 12, the diode 126 conducts during the negative going portion 136 of the square waveform 78 below the reference line 135 and the resulting waveform on the signal input line 82 of the lamp control detector and latch stage 84 depicted in FIG. 2 as 82 (ON) is a square wave with minimum excursions at 142 near the base reference line 134 and maximum excursions at 143 equal to the bias level of approximately six volts on line 82. Again due to the voltage drop across the diode 126, the minimum excursion at 142 will be above the zero volt base reference line 134.

The lamp control detector and latch stage 84 in response to the lamp on signal waveform during momentary actuation of the on switch 58, responds to the portions of the square wave at 142 below a predetermined voltage level, approximately +5 VDC in the specific embodiment being discussed. The lamp control detector and latch stage 84 generates a latched, lamp on control signal at the output 90. The lamp power supply 92 in response to the lamp on control signal at 90 initiates firing and continued operation of the projection lamp 70 in accordance with the operating power requirements of the lamp 70.

When the projection lamp 70 fires and generates illumination energy, a lamp status sensor 144 detects the operation of the lamp 70 and generates an output at 146 to the lamp control detector and latch stage 84. In response to the lamp detection output 146, the lamp control detector and latch stage 84 alters the normal +6 VDC bias level at the input line 82 to approximately zero to one VDC. Thus, the lamp status LED indicator 68 conducts on the positive excursions at 132 of the input signal waveform 78 to provide a visible indication of the operating status of the projection lamp 70. The lamp status indicator 68 remains in the conductive, illuminated state and the projection lamp 70 receives operating power from the power supply 92 in response to the latched, lamp on control signal at 90 until the off control switch 60 is actuated. In one specific embodiment, the lamp 70 is a high intensity arc-discharge lamp.

Upon actuation of the off control switch 60, the control signal waveform on line 82 (OFF) of FIG. 2, is detected by the lamp control detector and latch stage 84 and the output 90 is latched to a lamp off state. In response to the latched off control signal at 90, the lamp power supply 92 extinguishes operation of the lamp 70. In response, the lamp status sensor 144 upon the removal of illumination energy from the lamp 70 generates an output at 146 to condition the lamp control detector and latch stage 84 to re-establish the approximately +6 VDC bias level on the signal line 82. Accordingly, the lamp status indicator 68 is also extinguished.

The projection lamp 70 then remains in the inoperative state in response to the latched, off lamp control signal 90 until the on control switch 58 is actuated.

Similarly, the lamp off control 54 and the lamp on control 52 of the remote control arrangement 14 provide independent and concurrent control of the lamp 70 through the lamp control detector and latch stage 84 and lamp power supply 92. For example, the lamp on control 52 of the remote control arrangement 14 upon operation and over control signal line 28 generates the 82 (ON) signal of FIG. 2 and the lamp is fired and continues in the operating state. In response to operation of either the off control switch 60 of the remote control arrangement 12 or the off control of the remote control arrangement 14, the lamp 70 is extinguished and maintained inoperative.

Further, the local control arrangement 30 by operation of the lamp on control 38 and lamp off control 40 also independently and concurrently controls operation of the lamp 70. The local control arrangement 30 and the remote control arrangement 14 include identical circuitry to that illustrated in the remote control arrangement 12 as discussed hereinbefore. In the preferred embodiment however, the lamp status indicator 68 is omitted on the local control 30 as the operator of the local control arrangement adjacent the projector apparatus 10 can visibly and directly detect operation of the projection lamp 70.

Thus, the on and off state of the lamp 70 is controllable from any one of the plurality of remote control arrangements such as 12, 14 interconnected with the projector 10 in addition to the local control arrangement 30; the overall control arrangement of interconnected remote and local controls being characterized as a parallel control arrangement with independent and concurrent controllability resulting from the control signalling from each of the control arrangements 12, 14 and 30 for a predetermined time interval during the momentary operating time of the control switches and the latching nature of the lamp control detector and latch stage 84.

Turning now to a more detailed discussion of the drive or film transport control functions, the remote control arrangements 12, 14 and the local control arrangement 30 also utilize the output 78 of the signal generator 80 and the waveform 78 of FIG. 2 to synthesize or generate drive control signals to the projector apparatus 10 over the control signal line 86 to the drive control detector stage 88.

Specifically and referring now to the remote control arrangement 12, actuation of the forward control switch 62 generates the signal waveform on line 86 for a predetermined time interval identified as 86 (FWD) in FIG. 2 and identical to the waveform 82 (OFF). Thus the drive control detector stage 88 in response to the 86 (FWD) waveform on line 86 generates an output on the forward signal control line 94 to the drive, audio and fireshutter control logic stage 100 to condition the projector apparatus 10 to the forward drive mode as discussed hereinbefore.

Actuation of the reverse control switch 66 generates on line 86 the waveform identified as 86 (REVERSE) and identical to the 82 (ON) waveform of FIG. 2. The 86 (REVERSE) waveform is a square wave having excursions from approximately zero volts to approximately +6 VDC, portions 142 to 143 respectively. In response to the 86 (REVERSE) signal waveform on signal line 86, the drive control detector stage 88 generates an output on the reverse control signal line 96 to the drive, audio and fireshutter control logic stage 100 to condition the projector apparatus 10 to the reverse drive mode.

Upon actuation of the stop control switch 64, the input signal waveform 78 over line 16 and through the contacts of the stop switch 64 is connected to the signal control line 18 and to the drive control detector stage 88 over the control signal line 86. The waveform referred to at 86 (STOP) in FIG. 2 is a square wave having excursions from the zero volt reference level 134 to a twelve volt level at 150, i.e. the full amplitude of the square wave signal at 78. The drive control detector stage 88 in response to the stop signal waveform at line 86 during the predetermined operation time interval of the momentary stop contact switch 64 at the forward and reverse signal control line outputs 94 and 96 generates control signals to the drive, audio and fireshutter control logic stage 100 to stop film drive operation of the projector apparatus 10.

Similarly the forward, stop and reverse controls 46, 48 and 50 of the remote control arrangement 14 and the forward stop and reverse controls 32, 34 and 36 respectively of the local control arrangement 30 function in a manner similar to and independent of the forward, stop and reverse controls 62, 64 and 66 of the remote control arrangement 12.

Turning now to a more detailed discussion of the lamp control detector and latch stage 84, two comparators 152 and 154 are utilized to detect or decode the on and off lamp control signals on the signal control line 82 illustrated in FIG. 2, 82 (OFF) and 82 (ON). In the specific embodiment wherein the signal waveform at 78 is a square wave of +12 VDC maximum aplitude with respect to the reference level 134, a +6 VDC bias is provided on line 82 by the combination of a first bias resistor 156 connected between a +12 VDC supply reference 158 and the signal control line 82, a second bias resistor 157 connected between the line 82 and the ground reference potential 134, and a zener diode 162 connected cathode to anode between the line 82 and the ground reference potential 134. The signal control line 82 with +6 VDC bias is connected to the inverting input of the lamp off comparator 152 and the noninverting input of the lamp on comparator 154. The noninverting input of the comparator 152 is connected to a +7 VDC supply reference 164 and the inverting input of the comparator 154 is connected to a +5 VDC supply reference 166.

The output of the lamp off comparator 152 is connected through a resistor 167 to the inverting input of a second lamp off comparator 168. The inverting input of the comparator 168 is also connected through a resistor 170 to the +12 VDC supply reference 158 and to the ground reference potential 134 through a capacitor 172. The non-inverting input of the comparator 168 is connected to the +7 VDC supply reference 164. The output of the comparator 168 is connected to the reset input R of a flip-flop 174 arranged to function as a latch. The output of the comparator 168 is also connected to the +12 VDC supply reference 158 through a resistor 176.

The output of the lamp on comparator 154 is connected through two series resistors 178 and 180 to the inverting input of a second lamp on comparator 182. The inverting input of the comparator 182 is also connected to the +12 VDC reference supply 158 through the parallel combination of a resistor 184 and a capacitor 186. The noninverting input of the comparator 182 is connected to the +7 VDC reference supply 164. The output of the comparator 182 is connected to the set input S of the flip-flop 174. The output of the comparator 182 is also connected to the +12 VDC reference supply 158 through a resistor 188.

The Q data output of the flip-flop 174 is connected through a resistor 190 to the base of an NPN transistor 192. The emitter of the transistor 192 is connected to the ground reference potential 134 and the collector of the transistor 192 is connected to the output line 90 of the lamp control detector and latch stage 84.

In operation, the lamp off comparator 152 changes state and produces a near zero volt output level upon each transistion of the waveform 82 (OFF) above the +7 VDC supply reference level. The capacitor 172 is normally charged to the +12 VDC reference level and maintains the output of the comparator 168 at a low level to the reset input of the flip-flop 172. During the portions of the off control signal waveform at 82, above the +7 VDC level, the square wave signal at the output of the comparator 152 goes low and the capacitor 172 is discharged. After a predetermined time interval during which the off control signal is active on line 82, the capacitor 172 becomes discharged below the +7 VDC reference level and the output of the comparator 168 switches to a high output level to reset the flip-flop 174 with the Q output going low if previously high. A low Q data output state of the flip-flop 174 maintains the transistor 192 nonconductive. The component values of the resistors 166 and 170 and the capacitor 172 provide integration of the off control signal at the output of the comparator 152 and ensure adequate noise protection. For example, in a specific embodiment, a time interval of 100 to 150 milliseconds for the duration of the off control signal is sufficient to cause the comparator 168 to change output state from a low level to a high level. Thus, noise appearing on any of the signal lines and having a duration less than 100 milliseconds would not be capable of falsely triggering any of the circuitry to represent a false off control signal.

When the on control signal 82 (ON) is present at the signal control line 82, the output of the lamp on comparator 154 is driven to a low output state upon each transition of the on control signal at line 82 below the +5 VDC reference level. Without the presence of the lamp on control signal waveform on line 82, the output of the comparator 154 is at a high level. The presence of the off control signal does not change the high level output of the comarator 154 as the comparator 154 switches output state only in response to signals on the line 82 going below the +5 VDC reference level.

Thus, in the presence of the on control signal, the output of the comparator 154 switches from a high output state to a low output state and after a time interval of approximately 100 to 150 milliseconds the capacitor 186 is sufficiently charged to reduce the level at the inverting input of the comparator 182 below the +7 VDC reference level. At that point, the comparator 182 changes state from the normal low level to a high output level to provide a set signal to the flip-flop 174 resulting in a high level output at the Q data output. A high or one logic level at the Q output of flip-flop 174 renders the transistor 192 conductive. The lamp control output line 90 of the lamp control detector and latch stage 84 is connected to an opto coupler stage 194 of the lamp power supply 92. The lamp control output signal line 90 of the lamp control detector and latch stage 84 is connected to the cathode of an LED in the opto coupler 194 and the anode of the LED of the opto coupler 194 is connected through a resistor 196 to the +12 VDC reference level. Thus with transistor 192 being rendered conductive, current flows through the LED and the opto coupler generates an output to the power supply circuitry of the lamp power supply 92 to initiate ignition and continued operation of the projection lamp 70.

Since the on control signal is generated on signal control line 82 for a predetermined time interval dependent on the operating time of the momentary contact switch 58, the flip-flop 174 functions as a latch to maintain the last detected signal state until a new input is detected. After the on control signal waveform on the signal line 82 has ended, the Q data output of the flip-flop 174 remains high and the transistor 192 through opto coupler 194 conditions the lamp power supply 92 to maintain operating power to the lamp 70. When an off control signal is detected on line 82, the Q data output of the flip-flop 174 switches to a low output state with the transistor 192 being rendered nonconductive. With the transistor 192 nonconducting, the opto coupler 194 conditions the lamp power supply 92 to extinguish operation of the lamp 70.

During operation of the projection lamp 70, a photosensitive transistor 200 of the lamp status detector 144 is rendered conductive by illumination energy received from the lamp 70. The collector of the transistor 200 is connected to the +12 VDC reference supply and the emitter is connected to the lamp status control line 146. A resistor 202 is connected between the base and emitter of the transistor 200. When the transistor 200 is rendered conductive by illumination energy from the lamp 70, a high output level is provided at the lamp status control line 146.

The lamp status control line 146 is connected to the base of an NPN transistor 204 through a resistor 206. The emitter of the transistor 204 is connected to the ground reference potential 134 and the base of the transistor 204 is connected to the ground reference potential through a resistor 208. The collector of the transistor 204 is connected through a resistor 210 to the signal control line 82 of the lamp control detector and latch stage 84. The lamp status control line 146 is also connected through a diode 212 anode to cathode to the junction of the resistors 178 and 180.

With a high level on the lamp status control line 146 corresponding to operation of the lamp 70, the transistor 204 is rendered conductive and the normal +6 VDC bias level on the signal control line 82 is reduced or pulled down to a low voltage level near the zero volt reference level 134. Thus the lamp status LED indicator 68 is rendered conductive during the positive transitions of the waveform at 78 to provide the lamp ready status indication at the remote control arrangement 12 to the remote operator. The lamp status LED indicator 68 is useful since the location of the remote control arrangement 12 may be such that the projection lamp 70 is not visible to the remote operator. The output 146 through the diode 212 also provides a high level input to the inverting input of the comparator 182. This is necessitated by the removal of the normal +6 VDC bias on the signal control line 82 to prevent the low output of the comparator 154 from switching the comparator 182 to a high state which would thus hold the flip-flop 174 in a high Q data output state interfering with the reset function of the flip-flop 174 during the occurrence of a lamp off signal waveform.

Upon operation of the lamp off control switch 60 and with the near zero bias level on the line 82, the diode 124 acts as a steering diode to provide approximately the total amplitude of the square wave at 78, greater than 90% of the peak to peak amplitude, to the input line 82. Thus, the comparator 152 senses the positive transitions of the square wave 82 above the +7 VDC level and the Q data output of the flip-flop 174 goes low upon being reset to condition the lamp and power supply 92 to extinguish operation of the lamp 70. Consequently, the photosensitive transistor 200 of the lamp status sensor 144 is rendered nonconductive and the lamp status control line 146 returns to a low level.

The signal generator stage 80 in a specific embodiment includes a 555 series integrated circuit timer device, available from Signetics for example, to generate the square wave signal illustrated in FIG. 2 at output 78. To provide proper operation of the comparator stages 152, 154, 168 and 182 and the integration function provided by the capacitors 186 and 172 and the associated resistors, the duty cycle is required to be held between 50% and 53%. Thus the components associated with the integrated circuit timer device are appropriately selected in accordace with standard design techniques relating to application of the 555 integrated circuit timer.

Turning now to a discussion of the drive control detector 88, the approximate +6 VDC bias on the signal line 86 is provided by the combination of a first bias resistor 220 connected between the +12 VDC supply reference and the signal line 86, a second bias resistor 222 connected between the signal line 86 and the ground reference potential, and a zener diode 224 connected cathode to anode between the line 86 and the ground reference potential 134. The signal control line 86 is connected to the inverting input of a first forward comparator 226 and to the noninverting input of a second reverse comparator 228. The noninverting input of the comparator 226 is connected to the +7 VDC supply reference 164 and the inverting input of the comparator 228 is connected to the +15 VDC supply reference 166. The output of the comparator 226 is connected through a resistor 230 to the inverting input of a comparator 232. The inverting input of the comparator 232 is also connected to the ground reference potential through a capacitor 234 and to the +12 VDC supply reference through a resistor 236. The noninverting input of the comparator 232 is connected to the +7 VDC supply reference. The output of the comparator 232 is connected to the forward signal control line 94 and also to the +12 VDC supply reference through a resistor 238. The output of the comparator 228 is connected to the inverting input of a comparator 240 through a resistor 242. The inverting input of the comparator 240 is also connected to the ground reference potential through a capacitor 244 and to the +12 VDC supply reference through a resistor 246. The noninverting input of the comparator 240 is connected to the +7 VDC supply reference. The output of the comparator 240 is connected to the reverse signal control line 96 and to the +12 VDC supply reference through a resistor 248.

Upon operation of the forward drive control switch 62, the forward waveform 86 (FWD) of FIG. 12 is provided on line 86 as discussed hereinbefore. The output of the comparator 232 is driven from the normal low state to a high output state over the forward signal control line 94 to the drive, audio and fireshutter control logic stage 100 and specifically to the reset input R of a D flip-flop 250 arranged to function as a latch. Upon operation of the reverse drive control switch 66, the reverse control signal waveform 86 (REVERSE) of FIG. 2 is provided on the signal control line 86 and the output of the comparator 240 is driven from a normal low state to a high output state on the reverse control line 96 to the set input S of the flip-flop 250.

Considering now the details of the drive, audio and fireshutter control logic stage 100, the flip-flop 250 at the Q data output provides a high output level for the reverse film drive mode and a low level output for the forward film drive mode. When the stop film drive control switch 64 is operated, the stop signal waveform 86 (STOP) of FIG. 2 is provided on the line 86; the comparator 226 responds to the portions of the stop signal waveform above seven volts and a high output results on the forward control line 94. Similarly the comparator 228 responds to the portions of the stop signal waveform below five volts and a high output level results on the reverse control line 96. The high output levels on both the forward and reverse signal control lines 94 and 96 are utilized by the drive, audio and fireshutter control logic stage 100 to condition a stop mode of operation.

The foward signal control line 94 is connected to one input of a two input NOR gate 252 and to one input of a two input NAND gate 254. The second input of each of the gates 252 and 254 is connected to the reverse signal control line 96. The output of the NAND gate 254 is connected to one input of a two input NAND gate 256 arranged in a stop latch arrangement with a two input NAND gate 258. The output of the NAND gate 256 is connected to the second input of the NAND gate 258 and the output of the NAND gate 258 is connected to the second input of the NAND gate 256. The second input of the NAND gate 258 is connected through a capacitor 260 to the output of a two input Schmitt trigger NAND gate 262. A resistor 264 is connected between the +12 VDC supply reference and the junction of the capacitor 260 and the input of the NAND gate 258.

One input of the Schmitt trigger gate 262 is connected to the output of the NAND gate 254 and the second input of the Schmitt trigger 262 is connected through the series combination of two resistors 266 and 268 to the output of the NOR gate 252. The junction of the two resistors 266, 268 is connected through a capacitor 270 to the ground reference potential. The junction of the resistors 266 and 268 is also connected through the series combination of a resistor 272 and a diode 274 anode to cathode to the output of the NAND gate 254.

The output of the stop latch gate 256 is connected to one input of a two input OR gate 272. The output of the OR gate 276 is connected to the set input S of the flip-flop 278 arranged to function as a stop register or latch. The output of a second two input OR gate 280 is connected to the reset input R of the flip-flop 278. The second input of the OR gate 276 is connected to the output of a two input OR gate 282. One input of the OR gate 282 is connected to the output of a three input AND gate 284 and the second input is connected to the output of a second three input AND gate 286. One input of the three input AND gate 284 is connected to the reset input of the flip-flop 250.

A second input of the AND gate 284 is connected to the Q data output of a D flip-flop 288 arranged to function as a data register. The D input of the flip-flop 288 is connected to the Q data output of the flip-flop 250. The third input of the AND gate 284 is connected to one input of the AND gate 286. The second input of the AND gate 286 is connected to the Q data output of the flip-flop 288. The third input of the AND gate 286 is connected to the set input S of the flip-flop 250. The clock input CLK of the flip-flop 288 is connected to the output of a two input NAND gate 290.

One input of the NAND gate 290 is connected to the +12 VDC supply reference through a resistor 292 and through a capacitor 294 to the input of an inverter gate 296 and to the interconnected input of the gates 284 and 286. The second input of the NAND gate 290 is connected through a resistor 298 to the +12 VDC supply reference and through a capacitor 300 to the output of the stop latch NAND gate 256. The output of the inverter gate 296 is connected to one input of a three input AND gate 302. The second input of the AND gate 302 is connected to the Q data output of the stop register flip-flop 278. The third input of the AND gate 302 is connected to the output of the stop latch NAND gate 258.

The output of the AND gate 302 is connected through two series resistors 304 and 306 to the input of a Schmitt trigger gate 308 arranged to function as an inverter. The junction of the resistors 304 and 306 is connected to the ground reference potential 134 through a capacitor 310. The output of the Schmitt trigger gate 308 is connected through an inverter gate 312 to one input of the OR gate 280. The second input of the OR gate 280 is connected to a control input 106 from the drive control and drive motor arrangement 72.

The Q data output of the stop register flip-flop 278 is connected through a resistor 314 to the stop signal control line 112 to the drive control and drive motor stage 72. The $\overline{Q}$ data output of the flip-flop 278 is connected to one input of a two input NAND gate 316. The output of the NAND gate 316 is connected to the signal control line 102 to the fireshutter control and fireshutter arrangement 76. The two input NAND gate 316 is utilized to perform a logical OR function of data inputs.

The second input of the NAND gate 316 is connected to the signal control line 318 of a changeover detector stage 320. The output of the NAND gate 316 is also connected through two inverter gates 322 and 324 and a diode 326 anode to cathode to the audio control line 104.

The $\overline{Q}$ output of the data register flip-flop 288 is also connected through an inverter gate 328 and a diode 330 anode to cathode to the control line 104. The Q output of the data register flip-flop 288 is connected through a resistor 332 to the drive direction control line 108 to the drive control and drive motor arrangement 72. The input of the inverter gate 296 is connected to the output of the Schmitt trigger gate 336.

The input of the Schmitt trigger gate 336 is connected through a resistor 338 to the collector of an NPN transistor 340. The collector of the transistor 340 is also connected through a resistor 342 to the +12 VDC supply reference supply. A capacitor 344 is connected between the collector and emitter of the transistor 340. The emitter of the transistor 340 is connected to the ground reference potential. The base of the transistor 340 is connected through a resistor 346 to the control line 110 connected to the drive control and drive motor arrangement 72 as an output signal of a tachometer measuring rotational speed of the film drive motor.

Turning now to a discussion of the operation of the drive, audio and fireshutter control logic stage 100, assume that the main power switch 42 of the projector apparatus 10 is in the ON position, the film drive is in a stop mode, and the projection lamp is in the off mode. Under these conditions, the Q data output of the data register 288 is a low level on line 108 to the drive control and drive motor arrangement 72. When the forward drive control switch 62 is operated, the forward signal control line 94 provides a high logic level to the reset input R of the flip-flop 250 and thus the Q output switches to a low data level. This low data level is inputted at the D input of the flip-flop data register 288, but the data input is not clocked through to the Q data output of the flip-flop 288 until the clock input receives a signal with a low to high transition from the gate 290. In order to provide the clock signal to the data register 288, the stop latch comprised of gates 256 and 258 must first be reset by means of the Schmitt trigger gate 262.

With a high forward control signal on line 94, the output of OR gate 252 is a high logic level and is connected to one input of the Schmitt NAND gate 262. The other input of the Schmitt NAND gate 262 receives a high logic level from the output of the NAND gate 254 as the reverse control line 96 is a low logic level.

Thus, the Schmitt trigger NAND gate 262 receives two high logic level inputs when the high logic level from gate 252 delayed by the charging of capacitor 270 establishes a high logic level at the input of the Schmitt trigger gate 262.

At this point, the output of the Schmitt trigger gate 262 goes low and this negative going transition from a high to a low logic level state is coupled through the capacitor 260 to the input of the gate 258 of the stop latch arrangement. Thus, the output of the stop latch gate 258 switches to a high logic level and the output of the stop latch gate 256 goes to a low logic level. The negative transition at the output of the gate 256 is coupled through the capacitor 300 to the input of the NAND gate 290.

In response to the negative going transition at the input of the gate 290, the output of the gate 290 is a low to high transition to clock the flip-flop 288. When the flip-flop 288 is clocked, the low data level at the D input of the flip-flop 288 is clocked through to the Q data output. The low Q data output over control line 108 provides a forward drive mode control signal to the drive control and drive motor stage 72 whose operation will be explained in detail hereinafter.

At the same time that the output of the gate 290 clocks the data register 288, the output of the stop latch 258 returns to a high level and this high level is coupled to the gate 302. The other two inputs of the gate 302 are also at a high logic level. The second input to the gate 302 from the Q data output of the stop register 278 is high in the stop mode and remains high at this time. The third input to the gate 302 from the inverter 296 is also high since the tachometer output signal 110 is low; the drive motor being stopped at this time and the tachometer output is zero. The Q data output through resistor 314 provides a high level signal over the stop signal line 112 to inhibit the operation of the film drive motor in the drive control the drive motor arrangement 72.

With all three inputs to the gate 302 being high logic levels, the three input AND gate 302 provides a high output. The high output of gate 302 is presented to the input of the Schmitt trigger inverter gate 308 after a predetermined time delay as determined by the resistor 304 and capacitor 310, in a specific embodiment approximately 15 to 50 milliseconds. When the input of the Schmitt trigger inverter gate 308 reaches a high logic level, the output of the gate 308 goes low and the output of the inverter 312 in response thereto goes to a high logic level presented to the input of the gate 280.

The OR gate 280 provides a high output to the reset input R of the stop register 278. Thus the Q data output of the stop register 278 traverses from a high logic level to a low logic level. Through resistor 314 and over the stop control line 112, the stop motor inhibit signal is removed as the low logic level is reached and the drive motor begins operation. At this point the projector apparatus 10 is in the forward film drive mode with the projection lamp 70 off.

Operation of the lamp on switch 58 through the lamp control detector and lamp stage 84 conditions the power supply 92 to initiate firing and continued operation of the lamp 70 as explained hereinbefore. Thus, the projector apparatus 10 is then in the forward film drive mode with the projection lamp 70 in operation.

With the projector appartus 10 in the forward film drive mode, the drive, audio and fireshutter control logic stage 100 provides appropriate control of the drive control and drive motor arrangements 72 for direct mode switching from the forward film drive mode to the reverse film drive mode without the necessity of switching through the stop mode; i.e. the user of the projector apparatus may switch from the forward to reverse and reverse to forward drive modes directly.

With the projector apparatus 10 in the forward drive mode, if the reverse film drive control 66 is operated, the forward control line 94 is at the normal low data level and the reverse control line 96 switches from a low data level to a high data level. Since the drive motor is operational, the tachometer output line 110 provides an output signal and the output of gate 336 is a high level at one input of the three input AND gate 286. The second input of the three input AND gate 286 connected to the reverse drive control line 96 is also a high level. The third input of the three input AND gate 286 is also a high level since the $\overline{Q}$ output of the data register 288 is a high logic level in the forward mode.

Thus, the output of the three input AND gate 286 goes high and accordingly the output of the OR gate 282 also goes high. The output of the OR gate 282 is an input to the OR gate 276. Thus, the OR gate 276 provides a high logic level at the set input S of the stop register 278 causing the Q data output of the stop register 278 to go high. A high data output over the control line 112 conditions the motor speed control circuit of the drive control and drive motor arrangement 72 to stop and thus at that time the motor starts slowing down. When the speed of the motor reaches approximately 100 rpm, the transistor 349 is conditioned out of saturation and the output of the Schmitt trigger gate 336 traverses to a low logic level.

As the output of the gate 326 changes from a high to a low logic level, the negative going transition or falling edge signal is coupled through the capacitor 294 to the input of the gate 290. The input of the gate 290 goes high and clocks the data register 288. Thus, the high Q data output logic level from the flip-flop 250 is clocked through the data register 288 as a high level Q data output on the control line 108 corresponding to a reverse control mode.

In response to the control line 108 switching from a low level to a high level, the drive control and drive motor arrangement 72 on control line 106 provides a rising edge, positive transition signal, to the input of the gate 280. The output of the gate 280 provides a rising edge signal to reset the stop register 278 and the Q data output goes low. Thus the high level stop command is removed from the stop control line 112 and the drive motor is allowed to run in the reverse film drive mode.

Considering now the stop mode of operation, when the stop drive control switch 64 is operated, the forward drive control line 94 and the reverse control line 96 each switch from a low level to a high level. However, due to component tolerances of the resistors 206, 230, 242 and 246 and the capacitors 232 and 244, the occurrence of the rising edge signals on lines 94 and 96 are not necessarily simultaneous. Thus, the delay time provided by resistor 268 and capacitor 270 at the output of gate 252 prevents the relative timing difference between the two rising signals, a possible race condition, from defeating the appropriate stop control sequencing through the stop latch comprising gates 256 and 258.

Accordingly, regardless of the slight timing differences between the two signals on lines 94 and 96, the output of the gate 254 changes to a low logic level and sets the stop latch 256 before either of the signals on lines 94 and 96 can change the input of the gate 262 to a high level. With a low level at the input of the gate 256, a high logic level is provided at the outut of the gate 276 to set the stop register. The Q data output is set to a high level and through resistor 314 provides a high level stop signal to the motor control circuitry of the drive control and drive motor arrangements 72. In response to the stop command, the film drive motor coasts or slows down to a stop.

Considering now the fireshutter control and fireshutter arrangement 76 in more detail, whenever the drive control and drive motor arrangement 72 of the projector apparatus 10 receives a stop signal from the stop register 278 over the stop line 112, the fireshutter of the projector must be closed to prevent burning of the portion of the film that stops in proximity to the energized projection lamp 70. To perform the control of the fireshutter, the $\overline{Q}$ data output of the stop register 278 is connected to one input of the gate 316 to provide a high logic level fireshutter close signal on the control line 102 to the fireshutter control and fireshutter arrangement 76.

The fireshutter control line 102 is connected through a series resistor 350 to the base of an NPN darlington transistor 252. The emitter of the darlington transistor 352 is connected to the ground reference potential. The collector of the darlington transistor 352 is connected to one end of the fireshutter solenoid coil 353. The other end of the solenoid coil 354 is connected through a series resistor 356 to a +40 VDC supply reference 358. A diode 360 is connected anode to cathode between the collector of the transistor 352 and the resistor 356. A capacitor 362 is connected at one end to the ground reference potential 134. A resistor 364 is connected between the base of the transistor 352 and the ground reference potential.

Upon occurrence of a high level fireshutter close signal on line 102, the darlington transistor 352 is rendered conductive and operates the fireshutter mechanism 351 through the solenoid coil 354. The resistor 356 and the capacitor 362 provide efficient usage of the power supply of the projector apparatus 10 and insure operation over a wide range of power line voltages. Thus before the fireshutter solenoid coil 354 is energized, the capacitor 362 is fully charged to the +40 VDC supply voltage 358 that is utilized for operating power for the drive motor of arrangement 72.

When the darlington transistor 352 is rendered conductive, the capacitor 362 discharges through the fireshutter solenoid coil 354 at approximately double the operating current of the solenoid coil 354 to rapidly and reliably close the fireshutter mechanism 351. The capacitor 362 continues to discharge after initial operation of the solenoid to provide holding power for the fireshutter 351 through the solenoid coil 354. The steady state holding condition of the solenoid coil 354 results in approximately 12 VDC across the solenoid coil 354. The holding current at this operating point through the solenoid coil 354 is about one quarter that during initial operation.

In accordance with the control of the audio functions of the projector apparatus 10, the audio and audio control arrangement 74 includes an audio muting and audio enabling arrangement controlled over the audio control line 104 from the drive, audio and fireshutter control logic stage 100. A high logic level signal is provided on the audio control line 104 to control the audio and audio control arrangement 74 to mute or disenable both the main speaker output associated with the projector apparatus 10 and also an auxiliary amplifier output provided on the projector apparatus 10.

The high level audio muting signal is provided on the control line 104 whenever the projector apparatus is in a stop condition and also during the reverse drive mode. Further the audio is muted during rewind of the projector apparatus 10, not discussed in detail herein. The output of the gate 316 provides the audio mute signal on the control line 104 for the stop mode through the inverter gates 322, 324 and the diode 326. During the reverse drive mode, the audio mute signal is provided through the inverter gate 328 and the diode 330 to the control line 104. The input to the inverter gate 328 receives the reverse control signal from the $\overline{Q}$ output of the data register 288, a low logic level signal when the projector apparatus 10 is in the reverse mode.

The audio muting control circuit of the audio control stage 74 includes an audio control relay 370 controlled by an NPN transistor 372. The control line 104 is connected through a series resistor 374 to the base of the transistor 372. The collector of the transistor 372 is connected to one end of the relay coil 376 of the relay 370. The other end of the coil 376 is connected through a series resistor 378 to the +40 VDC supply reference 358. The emitter of the transistor 372 is connected to the ground reference potential. A resistor 380 is connected between the base of the transistor 372 and the ground reference potential. A diode 382 is connected anode to cathode between the collector of the transistor 372 and the resistor 378.

A high logic level signal on the line 104 from either of the wired logic "OR" paths through the diodes 330 and 326 renders the transistor 372 conductive and operates the relay 370.

One set of relay contacts 384 associated with the relay 370 includes a center terminal 386 connected to the audio amplifier output, a normally closed contact 388 connected to the speaker output and a normally open contact 390 connected to an internal resistive load during audio muting. A second set of relay contacts 392 includes a center terminal 394 connected to the ground reference potential, a normally closed contact 396 utilized in the changeover control arrangement discussed in detail hereinafter, and a normally open contact 398 connected to the auxiliary audio amplifier output.

Upon operation of the relay 370 during the muting function, the speaker output connected to contact 388 is muted and the amplifier output 386 is connected to the internal resistive load. Further, the auxiliary amplifier connected to the contact 398 through an appropriate series load is connected to the ground reference potential. Further, the ground connection at contact 396 is removed.

Considering now the drive control and drive motor arrangement 72, the structure and function of the drive, audio and fireshutter control logic 100 allows the use of a motor control relay 400 having a relatively limited switching capacity through its contact terminals to control the direction of motor operation and also to allow the direct switching from the forward to the reverse mode of operation as discussed hereinbefore.

The drive control and drive motor arrangement 72 also includes a servo control amplifier in the preferred embodiment to maintain accurate operational speed of the motor. The servo control amplifier is controlled over the stop control line 112 from the drive, audio and fireshutter control logic 100.

The motor control relay 400 is controlled by an NPN transistor 402 over the direction control line 108 from the drive, audio and fireshutter control logic stage 100. As discussed hereinbefore the direction control line 108 is a high level during the reverse direction drive mode of operation and a low level during the forward direction drive mode. The direction control line 108 is connected to the base of the transistor 402. The emitter of the transistor 402 is connected to the ground reference potential. The collector of the transistor 402 is connected to one end of a relay coil 404 of the motor control relay 400. The other end of the relay coil 404 is connected through a series resistor 406 to the +40 VDC motor supply reference 358. A diode 408 is connected anode to cathode between the collector of the transistor 402 and the resistor 406. A high control signal on the motor direction control line 108 (reverse mode) renders the transistor 402 conductive and operates the relay 400.

The motor control relay 400 includes a first set of relay contacts 410.

The relay contacts 410 include a center terminal 412 connected to one end of the armature circuit of the motor generally designated 414, a normally open contact 416 connected to the +40 VDC supply reference 358, and a normally closed contact connected to a motor control line 420 of the servo amplifier in the drive control and drive motor arrangement 72. The relay 400 includes a second set of contacts 422 having a center terminal connected to the other end of the armature circuit of the motor 414, a normally closed contact connected to the +40 VDC supply reference 358 and a normally open contact connected to the motor control line 420 of the servo amplifier.

Thus upon operation of the relay 400, the operational direction of the motor 414 is reversed by the reversal of the +40 VDC supply reference 358 and the motor control line 420 across the armature circuit of the motor 414.

The motor control relay 400 includes a third set of relay contacts 430 having a center terminal connected through a series capacitor 432 to the control line 106 providing a timing control signal to the drive, audio and fireshutter control logic stage 100. The normally closed contact and the normally open contact of the third set of contacts 430 are each connected to the +12 VDC supply reference 158. A resistor 434 is connected between the center terminal of the relay contacts 430 and the ground reference potential. A second resistor 436 is connected between the control line 106 and the ground reference potential. As discussed hereinbefore, upon operation of the motor control relay 400, as the contact arm of the contact set 430 moves from the normally closed to the normally open position, the capacitor 432 discharges through the resistors 434 and 436. At the time the center terminal 430 is connected to the normally open contact, +12 VDC is provided to the resistor 434 and the capacitor 432 couples the high transistion or rising edge signal over the control line 106 to the input of the gate 280 of the drive, audio and fireshutter control logic stage 100. In response to the rising edge signal, gate 280 outputs a high logic level to reset the stop register 278 as required in the sequencing from the forward to the reverse mode of film drive operation.

Considering now the operation of the changeover control arrangement and the changeover detector control stage 320, the projector apparatus 10 includes internal changeover control circuitry and external cable connections 450 for use with a second projector to accomplish changeover between two identical projectors utilized for multi-reel presentations wherein the projectors are alternatively operated and synchronized to provide continuous projection of a multi-reel presentation. To this end the local changeover control 44 is connected to a changeover control line 440.

Additionally, the changeover control arrangement of the projector apparatus 10 includes two external control lines 442 and 444 connected to the changeover detector control stage 320. Also utilized for the changeover control arrangement and for isolation of the two interconnected projectors, a resistor 446 is provided connected at one end to the +40 VDC supply reference 358 and at the other end to an external changeover control line 448. The normally closed contact 396 of the contact pair 392 of the audio control relay 370 is also connected to the external changeover control line 440 connected to the changeover control 44. The external changeover control lines 440, 442, 444 and 448 collectively comprise a changeover control cable or multi-conductor interconnection arrangement 450.

Figure 3:
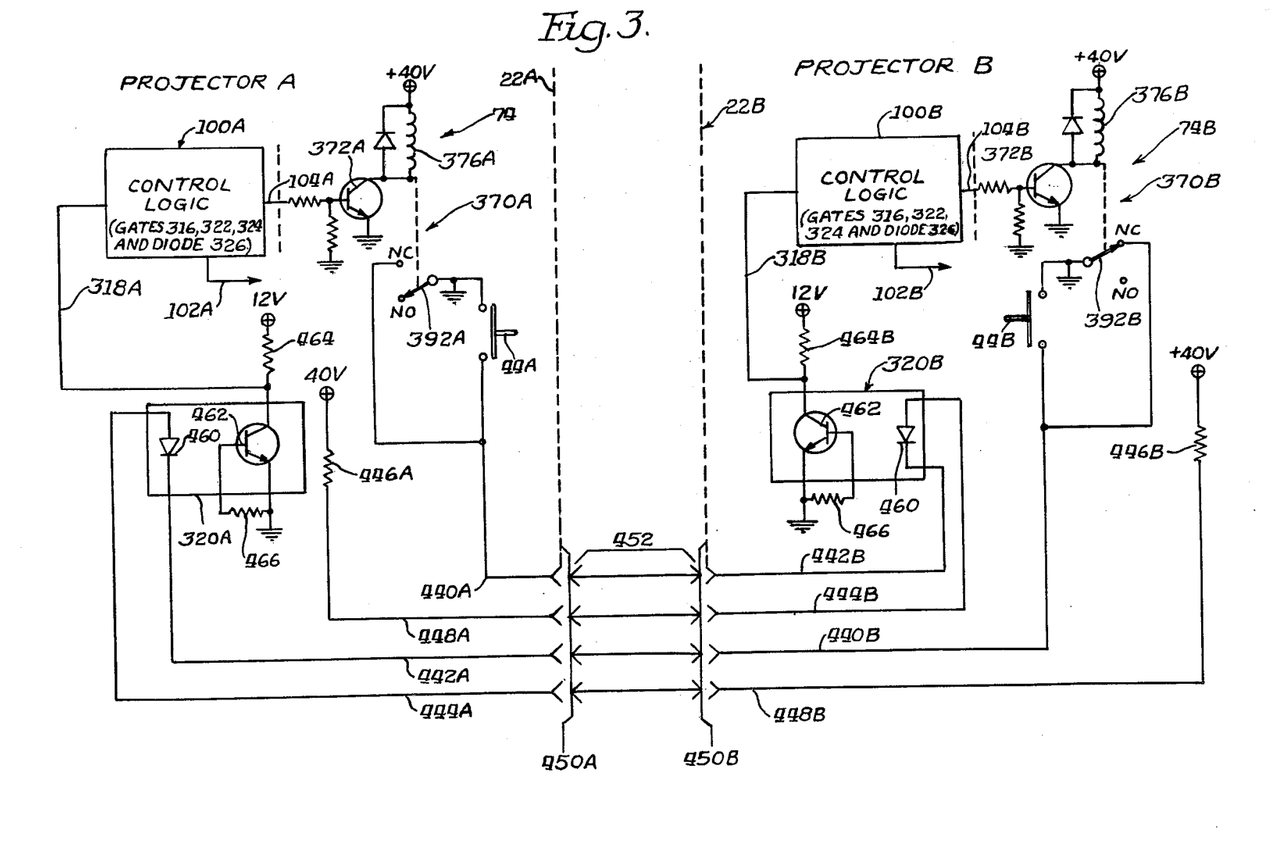
FIG. 3 is an electrical schematic drawing and diagrammatic representation of two projection apparatuses interconnected for projection of a multi-reel presentation and illustrating the structure and operation of the change-over control arrangement of the projection apparatus of FIG. 1.

Referring now additionally to FIG. 3, two projectors identified as projector A and projector B, each identical to the projector apparatus 10 of FIG. 1, are interconnected by a multi-conductor changeover control interconnection cable 452 between the external changeover interconnection arrangements 450A and 450B of the interconnected projectors A and B. The dashed lines 22A and 22B of FIG. 3 represent respectively the external frames or housings of the projectors A and B. The changeover control cable 452 and the changeover interconnection 450A and 450B of the projectors A and B are provided with suitable mating connectors or jacks and plugs. The changeover interconnection cable 452 interconnects the changeover control lines of the changeover controls 450A and 450B as follows: control lines 440A and 442B; control lines 448A and 444B; control lines 442A and 440B; and control lines 444A and 448B.

Assuming that the projector A is projecting the first reel of a multi-reel presentation in the forward drive projection mode with the projection lamp 70 in operation, when the first film reel of projector A reaches a predetermined changeover synchronization point, the operator of the projectors A and B is alerted to this occurrence and proceeds to changeover operation from projector A to projector B by operation of the changeover control 44B, a momentary contact switch.

Specifically, the changeover detector control arrangements 320A and B include an opto coupler arrangement having an LED 460 connected anode to cathode between the changeover control lines 444 and 442. The LED 460 of each opto coupler controls the operation of a photosensitive transistor 462. The collector of the photosensitive transistor 462 of the opto coupler is connected to the control line 318 and through a series resistor 464 to the +12 VDC supply reference 158. The base of the transistor 462 is connected through a resistor 466 to the ground reference potential and the emitter of the transistor 462 is connected to the ground reference potential.

By means of the changeover interconnection cable 452, the momentary contact switch 44B of the projector B over the control lines 440B and 442A conditions the changeover detector control 320A of the projector A, an opto coupler arrangement, to generate a low level signal on 318 A to the control logic of stage 100A to close the fireshutter mechanism 351A of the projector A over the control line 102A and to mute the audio arrangement 74A of the projector A over the control line 104A.

With operation of the audio control relay 370A of projector A, the ground connection from the normally closed contact of the relay contacts 392 A is removed and the LED 460B of the opto coupler arrangement 320B is de-energized. With the LED 460B no longer energized, the transistor 462 is rendered nonconductive and a high logic level signal is provided over line 318B to the gate 316B of the control logic stage 100B. This results in a low logic level signal at fireshutter control line 102B and the fireshutter 351B of projector B open. Further through the gates 322, 324 and the diode 326, a low logic level signal is also provided on the audio control line 104B and the audio arrangement 74B of the projector B is enabled as the relay contacts 392A of the relay 370A switch from the normally closed to the normally open position. The opening of the fireshutter 351B and enabling of the audio arrangement 74B is accomplished over the control lines 440A, 442B and through the opto coupler arrangement 320B, line 318B, the control logic 100B, the audio control line 104B to the audio control relay 370B and the fireshutter control lines 102B to the fireshutter control and fireshutter arrangement 76.

After the momentary contact operation time as determined by the characteristics of the control switch 44B and with the contact pair 392B in the normally closed position, a ground reference connection is provided over the lines 440B and 442A to provide continued operation of the audio muting function of the projector A as long as the audio control relay 370B of the projector B is in the audio enabling state and until the changeover control 44A is actuated.

After changeover of the multi-reel presentation from the projector A to the projector B, the second reel is projected by the projector B. At the end of the second reel, the changeover control 44A of the projector A is operated to changeover operation of the multi-reel presentation to the projector A for presentation of the third reel, if a third reel is required. Functioning of the changeover between the projector B to the projector A is identical to the changeover procedure from the projector A to the projector B (with reversal of the A and B references in the previous discussions).

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

I claim:

1. A control arrangement for projector apparatus, the projector apparatus including a selective drive control arrangement operable in at least two drive modes and a stop mode, and a selectively operable projector illumination source arrangement, the control arrangement comprising:

a signal generator within said projector apparatus for generating a predetermined waveform;

remote control means responsive to said signal generator and interconnected to said projector apparatus over a first signal generator conductor, a second drive signal control path conductor, and a third illumination source signal control path conductor, said remote control means comprising manually operable remote controls and remote control signal means responsive to said manually operably remote controls and said signal generator for selectively outputting a predetermined control signal in response to operation of each of said manually operable remote controls, said manually operable remote controls comprising a first predetermined number of remote illumination source controls, and a second predetermined number of remote drive controls, said control signal means outputting a predetermined signal having individually detectable characteristics on said second drive signal control path conductor in response to operation of each of said remote drive controls and outputting a predetermined signal having individually detectable characteristics on said third illumination source signal control path conductor in response to operation of each of said remote illumination source controls; and means within said projection apparatus and responsive to said predetermined signals on said second drive signal control path conductor and said third illumination source signal control path conductor for controlling the mode of operation of said selective drive control arrangement and said projector illumination source arrangement.

2. The control arrangement of claim 1 further comprising local control means within said projector apparatus and responsive to said signal generator, said local control means comprising manually operable local controls and local control signal means responsive to said manually operable local controls and said signal generator for selectively outputting a predetermined control signal in response to operation of each of said manually operable local controls, said manually operable local controls comprising a first predetermined number of local illumination source controls and a second predetermined number of local drive controls, said local control signal means outputting a predetermined signal having individually detectable characteristics on said second drive signal control path conductor in response to operation of each of said drive controls and outputting a predetermined signal having individually detectable characteristics on said third illumination source signal control path conductor in response to operation of each of said illumination source controls.

3. The control arrangement of claim 1 or 2 wherein each of said manually operable local controls and each of said manually operable remote controls comprises a momentary actuation switch.

4. The control arrangement of claim 1 or 2 wherein each of said remote drive controls and said remote illumination source controls corresponds in function to one of said local drive controls and said local illumination source controls, each of said corresponding manually operable local controls and manually operable remote controls upon actuation outputting the same predetermined signal on said second drive signal control path conductor or said third illuminator source signal control path conductor.

5. The control arrangement of claim 1 or 2 wherein two or more of said remote control means are interconnected in parallel to said projector apparatus and each of said remote control means is capable of independently controlling operation of said projector apparatus.

6. The control arrangement of claim 1 or 2 wherein said remote drive controls comprises a forward drive control, a reverse drive control and a stop drive control.

7. The control arrangement of claim 6 wherein said remote illumination source controls comprises a lamp off control and a lamp on control.

8. The control arrangement of claim 1 or 2 wherein said remote control means further comprises lamp status indicator means connected between said third illumination source signal control path conductor and said first signal generator conductor.

9. The control arrangement of claim 8 wherein said operation mode controlling means comprises indicator control means for placing a first DC bias level on said third illumination source signal control path conductor when said illumination source is inoperative and placing a second DC bias level on said third illumination source signal path conductor when said illumination source is operative, said lamp status indicator means being rendered conductive when said illumination source is operative.

10. The control arrangement of claim 9 wherein said indicator control means comprises illumination source status detection means for detecting the operative state of said illumination source and generating an output indicative of said operative state.

11. The control arrangement of claim 10 wherein said output of said illumination source detection means controls operation of said indicator control means.

12. The control arrangement of claim 11 wherein said illumination source status detection means comprises a photosensitive transistor positioned to receive illumination from said projector illumination source.

13. The control arrangement of claim 1 or 2 wherein said operation mode controlling means comprises illumination source control means for detecting said predetermined signals on said third illumination source signal control path conductor and for generating a first lamp on control signal in response to a first of said predetermined signals received during operation of a first of said remote illumination source controls and a second lamp off control signal in response to a second of said predetermined signals received during operation of a second of said remote illumination source controls.

14. The control arrangement of claim 13 wherein said operation mode controlling means further comprises drive control means for detecting said predetermined signals on said second drive signal control path conductor and for generating a first drive control signal in response to a first of said predetermined signals received during operation of a first of said remote drive controls, a second drive control signal in response to a second of said predetermined signals received during operation of a second of said remote drive controls and a third drive control signal in response to a third of said predetermined signals received during operation of a third of said remote drive controls.

15. The control arrangement of claim 14 wherein each of said manually operable remote controls comprises a momentary operation switch remaining closed for a predetermined time interval upon actuation, said illumination source control means comprising latch means for maintaining said lamp on and lamp off control signals after operation of said respective remote illumination source controls, said drive control means comprising latch means for maintaining said three drive control signals after operation of said respective remote drive controls.

16. The control arrangement of claim 15 wherein said first drive control signal is a first forward signal on a first forward drive control line, said second drive control signal is a second reverse signal on a second reverse drive control line, and said third drive control signal is a stop signal comprising said first forward signal and said second reverse signal on said forward and reverse drive control lines respectively.

17. The control arrangement of claim 16 wherein said first and second remote illumination source controls correspond respectively to lamp on and lamp off remote control functions.

18. The control arrangement of claim 16 wherein said first, second and third remote drive controls correspond respectively to forward, reverse and stop remote control functions.

19. The control arrangement of claim 1 wherein said remote control means comprises passive circuit components for selectively modifying said predetermined waveform from said signal generator in a predetermined manner upon operation of said manually operable remote controls.

20. The control arrangement of claim 1 or 2 wherein said illuminatiion source controls comprises a lamp on and a lamp off control and said drive controls comprises a forward, a reverse and a stop control, each of said controls comprising a momentary actuated switch including two switch terminals connected during operation of said respective switch.

21. The control arrangement of claim 20 wherein said control signal means comprises a first diode having a cathode connected to a first of said lamp on switch terminals and an anode connected to said third illumination source signal control path conductor, a second diode having an anode connected to a first of said lamp off switch terminals and a cathode connected to said third illumination source signal control path conductor, said second switch terminals of each of said lamp on and lamp off switches being connected to said first signal generator conductor.

22. The control arrangement of claim 21 wherein said control signal means further comprises a third diode having an anode connected to a first of said forward switch terminals and a cathode connected to said second drive signal control path conductor, a fourth diode having a cathode connected to a first of said reverse switch terminals and an anode connected to said second drive signal control path conductor, a first of said stop switch terminals being connected to said second drive signal control path conductor, and the second terminal of each of said forward, reverse and stop switches being connected to said first signal generator conductor.

23. The control arrangement of claim 22 wherein said control signal means further comprises lamp status indicator means connected between said third illumination source signal control path conductor and said first, said lamp status indicator means being rendered operative in response to said predetermined waveform from said signal generator and a predetermined bias condition on said third illumination source signal control path.

24. The control arrangement of claim 1 or 2 wherein said remote control means is detachably interconnected to said projector apparatus by said three conductors, said three conductors comprising an interconnection cable.

25. The control arrangement of claim 1 or 2 wherein said projector apparatus and said remote control means comprises detachable interconnection means for connecting said three conductors from said remote control means to said projector apparatus.

26. The control arrangement of claim 1 or 2 wherein said predetermined waveform of said signal generator is a square wave signal including peak to peak transitions between a reference level A and a maximum amplitude B.

27. The control arrangement of claim 26 wherein said control signal means outputs a first square wave signal including peak to peak transition between approximately said reference level A and a maximum amplitude approximately equal to one half of amplitude B on said third illuminator source signal control path conductor in response to operation of a first of said illumination source controls and a second square wave signal including maximum peak amplitudes of approximately level A and minimum peak transition equal to approximately one half of the level B in response to operation of a second of said illumination source controls.

28. The control arrangement of claim 27 wherein said operation mode controlling means comprises means for detecting said first and second square wave signals, said detecting means comprising first means for detecting when said square wave signals exceed a reference level approximately equal to the sum of one half of said amplitude B and an amplitude C and second means for detecting when said square wave signals are below a reference level approximately equal to the difference of one half of said amplitude B and an amplitude C.

29. The control arrangement of claim 26 wherein said control signal means outputs a first square wave signal including peak to peak transitions transistion between approximately said reference level A and a maximum amplitude approximately equal to one half of said amplitude B on said second drive signal control path conductor in response to operation of a first of said drive controls, a second square wave signal including a maximum peak amplitude of approximately level A and minimum peak transitions equal to approximately one half of the level B in response to operation of a second of said drive controls, and a third square wave signal including peak to peak transitions between approximately said levels A and B in response to operation of a third of said drive controls.

30. The control arrangement of claim 29 wherein said operation mode controlling means comprises means for detecting said three square wave signals, said detecting means comprising first means for detecting when said square wave signals exceed a reference level approximately equal to one half of said amplitude B and an amplitude C and second means for detecting when said square wave signals are below a reference level approximately equal to the difference of one half of said amplitude B and an amplitude C.

31. The control arrangement of claim 2 wherein each of said manually operable local controls and each of said manually operable remote controls comprises a momentary operation circuit path completing device, two or more of said remote control means are interconnected in parallel to said projector apparatus, each of said manually operable local and remote controls being capable of independently controlling the operational state of said projector apparatus corresponding to the associated function of said controls.

* * * * *

UNITED STATES PATENT AND TRADEMARK OFFICE
CERTIFICATE OF CORRECTION

PATENT NO. : 4,202,611
DATED : May 13, 1980
INVENTOR(S) : Robert R. Parker

It is certified that error appears in the above-identified patent and that said Letters Patent are hereby corrected as shown below:

Column 4, line 4, change "signals" to --signal--;

Column 5, line 52, after "on", insert --to--;

Column 9, line 32, correct spelling of "comparator" (first occurrence);

Column 11, line 23, change "+15 VDC" to --+5 VDC--;

Column 11, line 46, change "FIG. 12" to --FIG. 2--;

Column 12, line 8, correct spelling of "forward";

Column 12, line 27, after "trigger", insert --gate--;

Column 12, line 37, delete "the" (second occurrence) and insert --a--;

Column 14, line 45, delete "the" (second occurrence) and insert --and--;

Column 14, line 52, delete "of" and insert --to--;

Column 16, line 31, change "252" to --352--;

Column 16, line 34, change "353" to --354--;

UNITED STATES PATENT AND TRADEMARK OFFICE
CERTIFICATE OF CORRECTION

PATENT NO. : 4,202,611
DATED : May 13, 1980
INVENTOR(S) : Robert R. Parker

It is certified that error appears in the above—identified patent and that said Letters Patent are hereby corrected as shown below:

Claim 27, line 3, change "transition" to --transitions--;

Claim 27, line 10, change "transition" to --transitions--; and

Claim 29, line 3, after "transitions", delete --transistion--.

Signed and Sealed this

Seventeenth Day of November 1981

[SEAL]

Attest:

Attesting Officer

GERALD J. MOSSINGHOFF

Commissioner of Patents and Trademarks